United States Patent [19]
Dormehl et al.

[11] 3,754,178
[45] Aug. 21, 1973

[54] APPARATUS FOR ADJUSTING THE TOOLS OF A MULTI-SPINDLE TOOL MACHINE

[75] Inventors: Erich Dormehl; Hans Maas, both of Giessen, Germany

[73] Assignee: Heyligenstaedt & Company Werkzewgmaschinenfabrik GmbH, Giessen, Germany

[22] Filed: July 2, 1971

[21] Appl. No.: 159,118

[30] Foreign Application Priority Data
July 4, 1970 Germany............... P 20 33 250.7

[52] U.S. Cl. ............................ 318/572, 318/632
[51] Int. Cl. ....................................... G05d 23/75
[58] Field of Search ........................... 318/572, 632

[56] References Cited
UNITED STATES PATENTS
3,340,447 9/1967 MacDonald .................. 318/572 X
3,605,531 9/1971 Izumi et al. .................. 318/572 X
3,400,313 9/1968 Bullard et al. ................... 318/572

*Primary Examiner*—B. Dobeck
*Attorney*—Woodhams, Blanchard & Flynn

[57] ABSTRACT

Means compensating for tool wear in a multi-spindle machine tool. A cross slide, as for a lathe, is provided carrying one tool, such as a single point tool. A carrier is moveably supported on the cross slide for carrying a second tool, such as a single point tool. A first feeler responds to the position of the cross slide and suitable switching and driving means adjust the cross slide to a proper displacement from a given zero position of the numerical control apparatus to compensate as desired in such position for tool wear. A second feeler responds to the location of said carrier on said cross slide and through further switching, summing and comparing apparatus automatically moves said second tool on the cross slide to compensate as required for tool wear and automatically maintains a constant spacing between the working edges of said tools.

1 Claim, 2 Drawing Figures

INVENTORS
ERICH DORMEHL
HANS P. MAAS
BY
ATTORNEYS

Patented Aug. 21, 1973

INVENTORS
ERICH DORMEHL
HANS P. MAAS
BY
Woodhams, Blanchard and Flynn
ATTORNEYS

APPARATUS FOR ADJUSTING THE TOOLS OF A MULTI-SPINDLE TOOL MACHINE

The invention relates to multi-spindle machine tools, particularly to numerically controlled double-spindle lathes and deals with an arrangement for adjusting the tools.

In machines of the named type at least two tools must be adjusted in such a manner that they are spaced respectively at exactly the same distance from the axes of the lathe spindle. For this purpose, the machines if they are double-spindle machines have a cross slide with a fixed tool carrier and a moveable tool carrier which is moveable on the cross slide so that the second tool can be adjusted independently from the cross slide and thus, by means of the cross slide independently from the first tool.

In controlled machine tools with several spindles it would at first impression be sufficient to adjust the tools at the start of a machining operation or a workpiece series. However the wear of the tool materials forces as a practical matter a readjusting of the tool holders in more or less short time intervals. Further, since the wear on the tools is often not even, the tool holders must often be adjusted differently. If for example the tool of the fixed tool holder shows wear, same can be balanced only by a movement of the cross slide. If, however, the tool of the moveable tool holder shows no wear, the movement of the cross slide from its zero position must be balanced through an opposite movement of the moveable tool holder.

Such adjustment of the tool holder is presently carried out manually or is based on measurements and calculations which must be done by the operator of the machine. This requires time and is also a cause for mistakes. Thus, a major purpose of the invention is to provide an arrangement with which, when one or both tools are worn, the adjustment of the cross slide and the adjustment of the moveable tool carrier can be carried out automatically.

An arrangement for adjusting the tools of a multistage machine tool of the type mentioned above is characterized according to the invention by a cross slide with a driving motor, a first tool carrier fixedly secured on said driving motor and a second tool carrier with a driving motor, which tool carrier can be moved on the cross slide, an indicating device for the position of the cross slide, an indicating device for the position of the second tool carrier, an apparatus which compares the information of the indicating device with respect to the position of the cross slide to an adjustable nominal value and moves the cross slide by means of the driving motor until the actual and the nominal values correspond, an apparatus which compares the information of the position indicator of the second moveable tool carrier to a value which corresponds to the sum of an adjustable nominal value and the negative value of the nominal value predetermined for the cross slide, and controls the motor of the moveable tool carriage in such a manner that the actual value of the tool carriage corresponds to the above-mentioned sum of the nominal values.

One exemplary embodiment of the invention is described hereinafter in connection with the drawings, in which.

Figure 1:
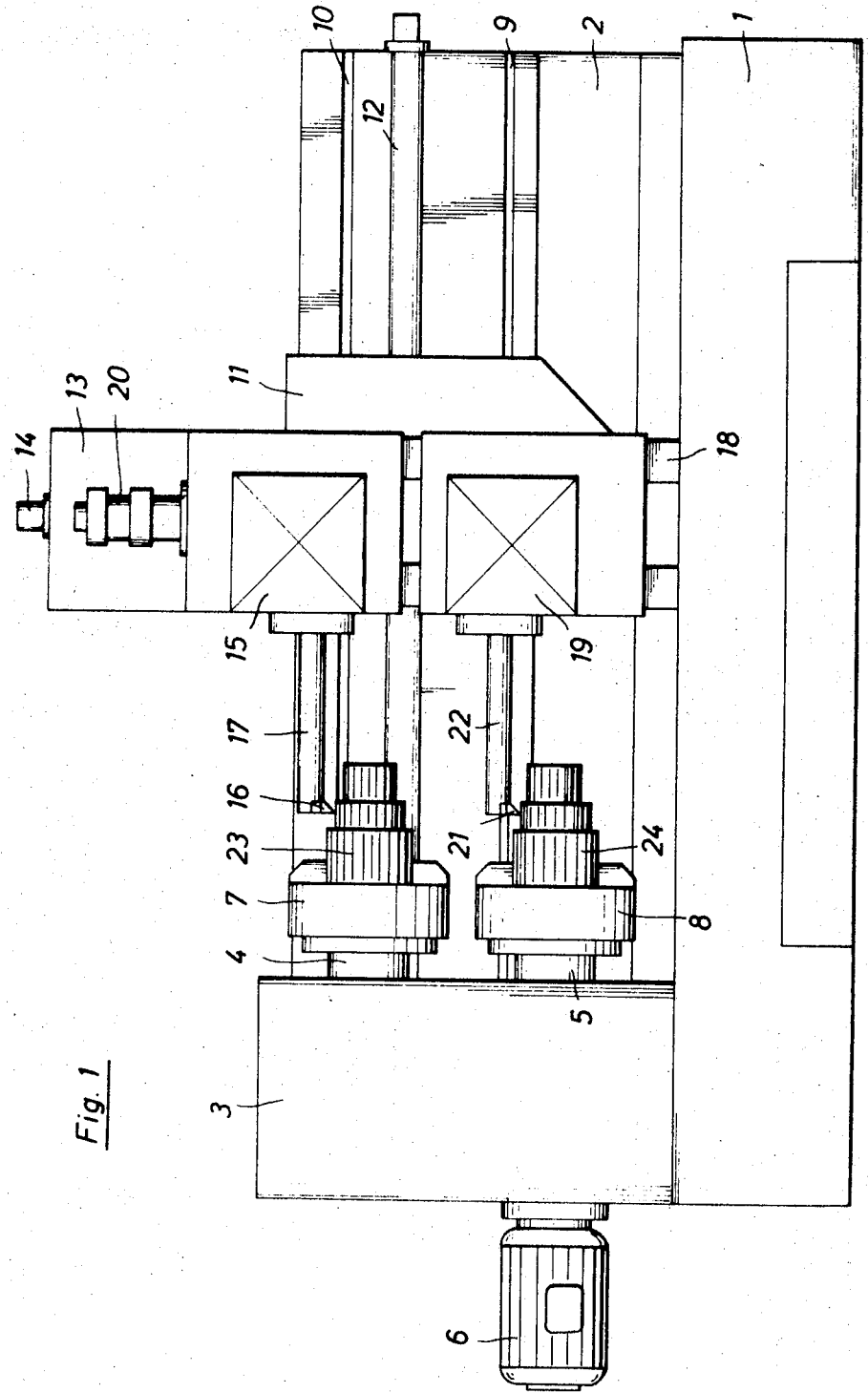
FIG. 1 is a front view of a double-spindle lathe.

The lathe illustrated in FIG. 1 has a base 1 on which is mounted a bed 2 which is rearwardly inclined. This bed carries a spindle box 3 with two spindles 4 and 5. A driving motor 6 is used to drive both spindles. Each spindle respectively carries, as is common, the chucks 7 and 8.

The bed 2 carries two guide ways 9 and 10 to guide a table 11, the driving screw of which is identified with 12. The table carries a cross slide 13, which is moveable perpendicularly to the table 11 on a dovetail guide (not shown) on the table 11. The driving motor for the cross slide is identified with reference numeral 14.

A fixed tool carrier 15 with a tool 16, that is with a cutting tip which is secured on a rod 17, is positioned on the cross slide 13. A second moveable tool carrier 19 is positioned on a dovetail guide 18 of the cross slide 13. Its driving motor is identified with 20. It is secured on the tool carrier 15. The tool carrier 19 carries the tool 21, 22 similar to that of the tool carrier 15. Both tools work similarly shaped workpieces which are identified with 23 and 24 and are held by the chucks 7 and 8.

Figure 2:
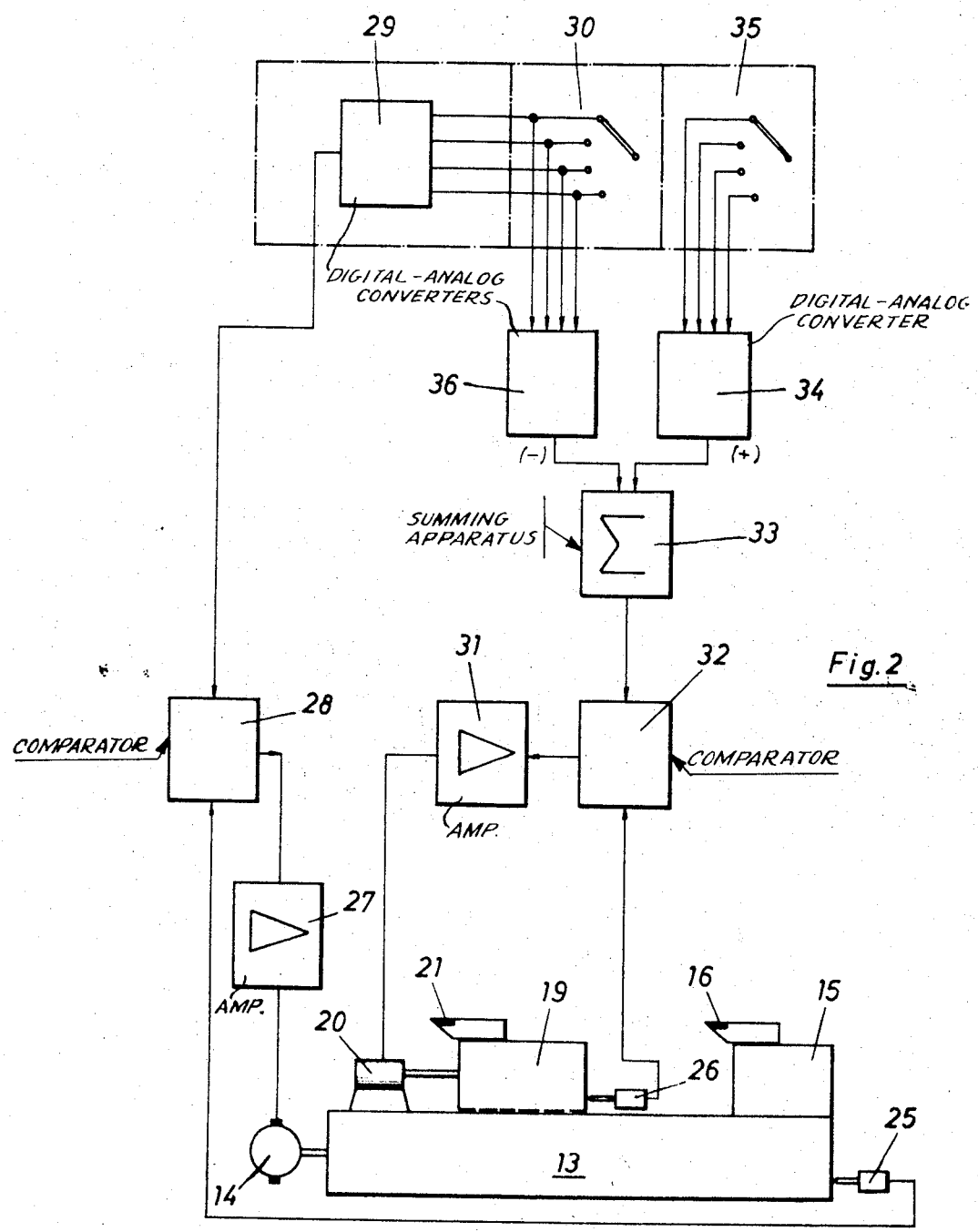
FIG. 2 is a block diagram of the adjustable arrangement according to the invention.

FIG. 2 illustrates schematically only the cross slide 13 portion of the lathe, together with the fixed tool carrier 15 and the moveable tool carrier 19. The tools 16 and 21 carried by both are indicated, as is also the driving motor 14 of the cross slide and the driving motor 20 of the tool carrier 19. A feeler 25 in the initial position of the cross slide indicates the position of the carriage, namely at a given numerical control position of the cross slide said feeler indicates the zero position of the carriage or the deplacement which exists from such position. The present case deals with an indicating device which converts the respective deplacement into a voltage which is proportional to the deplacement.

A position indicator 26 is also associated with the moveable tool carrier 19. It indicates in form of an electrical quantity the displacement of this tool carrier from an initial position. In the initial position both tools 16 and 21 are adjusted in such a manner that they are spaced at exactly the same distance from their associated spindle axis.

The driving motor 14 of the cross slide is connected through an amplifier 27 to the comparator 28. This comparator compares the voltage output of the apparatus 25 to the voltage of a digital-analog convertor 29 the adjustment of which can be accomplished by means of a conventional decade switch 30. By means of this switch the position of the cross slide can be controled; that is, possible displacements from the zero position can be eliminated if in case of wear of the tools 16 or 21, or of both, there is required a new adjustment of the cross slide 13 at the start of the numerical control of the carriage.

The driving motor 20 of the tool carrier 19 is connected to a comparator 32 through an amplifier 31. A voltge occurring at the position indicator 26 and a voltage coming from a summing apparatus 33 are fed to said comparator 32. If these voltages are not equal, the amplifier 31 receives current and causes a movement of the tool carrier 19 until equal voltages from 33 and 26 are again obtained. The apparatus 33 is connected to a decade switch 35 through a digital-analog convertor 34 and also to the decade switch 30 through a second digital-analog convertor 36. However, the connections are such that the information from the switch 30 is fed to the summing apparatus 33 in a negative form, while the condition of the switch 35, as usual, is supplied in a positive form. Thus, the apparatus 33 adds the positive value of the switch 35 and the negative value of the switch 30 or voltages corresponding to the positions of said switches. This means that a correction of the zero position of the cross slide caused by the switch 30 and thus of the position of the first tool is cancelled by a movement of the tool carrier 19 which movement is opposite to the movement of the cross slide and of equal magnitude, unless the same correction as for the cross slide was adjusted on the switch 35. In this case the tool carrier 19 follows the movement of the cross slide. The tool carrier 19 can be moved by means of the switch 35 independently from the cross slide.

The embodiments of the invention in which an exclusive property or privilege is claimed are defined as follows:

1. An apparatus for compensating for tool wear in a multi-spindle machine, comprising:
   a movable cross bar and first drive means therefor;
   a first tool carrier fixedly mounted on said cross bar;
   a second tool carrier including means for mounting said second tool carrier on said cross bar for longitudinal movement therealong and second drive means therefor;
   first indicating means for indicating the position of said cross bar and producing a first signal in response thereto;
   second indicating means for indicating the position of said second tool carrier on said cross bar and producing a second signal in response thereto;
   first adjustable signal generating means for producing a first desired value signal indicative of the desired position of said cross bar;
   second adjustable signal generating means for producing a second desired value signal indicative of the desired position of said second tool carrier along said cross bar;
   first comparator means for comparing said first desired value signal with said first signal produced by said first indicating means and producing a first control signal indicative of the sum thereof for controlling said first drive means until the sum of said first desired value signal and said first signal are nulled;
   summing means for summing said first and second desired value signals and producing a third desired value signal; and
   second comparator means for comparing said thrid desired value signal with said second signal produced by said second indicating means and producing a second control signal indicative of the sum thereof for controlling said second drive means until the sum of said third desired value signal and said second signal are nulled;
   whereby a change of at least one of said first and second adjustable signal generating means will effect an alteration in the sum produced by at least one of said first and second comparator means to alter the desired position of at least one of said cross bar and thence said first tool carrier fixedly mounted thereon and said second tool carrier.

* * * * *